Patented Sept. 27, 1932

1,879,697

UNITED STATES PATENT OFFICE

HUGO G. LOESCH, OF ROCHESTER, NEW YORK, ASSIGNOR, BY MESNE ASSIGNMENTS, TO GENERAL FOODS CORPORATION, OF NEW YORK, N. Y., A CORPORATION OF DELAWARE

PECTIN PREPARATION

No Drawing.  Application filed December 10, 1925. Serial No. 74,626.

My invention relates to food products and more particularly to preparations containing the jellifying ingredient, pectin, one object of the invention being to provide such a preparation or compound of a stable nature, readily soluble in water and fruit juice and which is adapted to combine effectively with the proper amount of water and sugar to form a jelly. A further object is to provide such a preparation adapted to contain flavoring and coloring ingredients in the form of a complete and homogeneous product for use with water and sugar to form jellies.

It is known that in the making of fruit jellies, pectin and acid are essential along with a definite amount of sugar. My invention comprises a pectin-acid mixture in a stable form for making preserves and jellies and further comprises the addition of sufficient flavor and color to such pectin-acid product to produce palatable flavored and colored jellies. True fruit or synthetic flavors and colors can be used.

In my product the acid is in actual solution while the pectin is present in more or less finely divided particles insoluble in the liquid medium, which medium is miscible with water but on dilution of the preparation with water the pectin particles readily dissolve without lumping.

A mixture of dry pectin in granular form with acid has been proposed in the art and also a dry mixture of pectin, acid and sugar. These mixtures are not very satisfactory, for powdered sugar and acid react under ordinary conditions to form a hardened cake; moisture is taken up by the mixture and there is a deterioration in general appearance and quality of the product. Further, no substantial amount of flavor can be incorporated into such dry mixtures, due to the fact that most flavors are liquids or in liquid form and their addition in any appreciable quantity sufficient to impart characteristic flavor to the jelly made with the dry mixture would wet or cake the dry mass so as to make it impracticable. Also in a dry powdered mixture the amount of evaporation of volatile flavors would be great because of the large surface exposed.

The pectin-acid mixture of my invention comprises powdered pectin and acid in a liquid medium which dissolves the acid and wets but does not dissolve the pectin. Furthermore, it is desirable that the medium be such that the added flavor and color be miscible with it and thus form a completely homogeneous product which on combination with the proper amount of water and sugar forms a jelly.

Alcohol, glycerine and sugar syrup are suitable mediums to effect the pectin-acid product of my invention and as sugar is a natural ingredient of jelly, the following samples are predicated on the use of a sugar syrup as the medium for my pectin-acid product.

The solubility of pectin in sugar solution is greatly influenced by the presence of acid in such syrup. Using a dry powdered pectin made by alcohol precipitation from a pectin concentrate of the nature described in U. S. Patent No. 1,235,666, I find that powdered pectin exerts its full jellifying power on dissolving in a 40% sugar solution with aid of heat. It loses about one-third of its jelly value at 50% sugar concentration and is practically insoluble in 58% sugar solution.

The addition of approximately 0.20% organic acid such as tartaric acid to a 40% sugar solution prevents solution of the pectin, although in a non-acid 40% sugar solution the pectin dissolves completely. The maximum percentage of sugar in an approximately 0.20% acid solution, in which acid-sugar solution pectin will completely dissolve is approximately 30%. Percentages of sugar above 30% in such acid solution cause decrease in solubility of pectin, until at 40% sugar content, the pectin is practically completely insoluble.

Raising the acidity to 0.60% in a 30% sugar solution causes practically complete insolubility of the pectin. From the above it is readily seen that solutions containing various proportions of sugar and acid can be effected in which solutions powdered pectin will be insoluble.

As a very suitable liquid medium for my powdered pectin and acid I employ a simple syrup which contains approximately 65% sugar or more conveniently still a saturated solution of sugar at room temperature, which contains approximately 67% sugar and is easily made by adding sugar to water until no further solution takes place. This saturated solution has preservative power because of its very high sugar content.

The amount of acid dissolved in the syrup may be varied to produce any desired acidity in the finished jelly. There is however a minimum limit to the percentage of acid necessary for jellification which is approximately 0.15% in the jelly. An acidity of 0.25% in the jelly is desirable and higher percentages can be used of course to obtain increased tartness or flavor.

A further advantage of my moistened or liquid preparation of powdered pectin is that any suitable organic acid can be used e. g. lactic which is liquid and citric acid which contains water of crystallization. These acids cannot be used in dry preparations because of their water content. Tartaric and malic acid are also suitable acids for my product.

Pectin will vary in its jellifying power depending on its source and its mode of preparation. Usually 0.4% to 0.5% of dry pectin makes a jelly of commercial strength. By varying the proportion of pectin to syrup any desired consistency from a paste or semifluidity to a highly fluid or liquid product can be obtained. By virtue of the fact that my pectin product is in paste or liquid form I can add any desired amount of suitable flavor and color, which blend or mix to form a homogeneous product.

This preparation of powdered pectin is particularly adapted for household use. The plain or unflavored product, consisting of pectin and acid in a saturated sugar solution, can be used by dissolving it in fruit juice or crushed fruit and then adding sugar to make jellies or jams. The flavored article can be readily made into delicious jelly by adding it to a definite quantity of hot or cold water, bringing just to a boil, adding the proper amount of sugar, bringing again to a boil to dissolve the sugar and then pouring the jelly into suitable containers.

The pectin in my preparation is not in solution, but is insoluble therein and before adding the necessary amount of sugar to make the jelly, the pectin must be first dissolved by diluting the product with sufficient water, fruit juice or crushed fruit, which so lowers the acid and sugar percentage that the pectin is no longer insoluble but goes into solution. As my product contains but a very small part of the required amount of sugar necessary to jellify the pectin-acid combination, a definite amount of sugar is added after dissolving the product in water. The mixture is then heated without prolonged boiling (U. S. Patent No. 1,304,166) to dissolve the sugar and sterilize the mass, after which it is allowed to cool and jellification ensues.

A convenient combination of ingredients to make my unflavored product is as follows, using a powdered pectin 0.4% of which makes a good jelly: 4.4 g. powdered pectin, passing a 100 mesh sieve, 2.75 g. tartaric acid or lactic acid, 50 cubic centimeters of 67% sugar solution. This mixture may be prepared with the aid of any suitable apparatus. The above combination fills approximately a 2 fluid ounce bottle or container.

If the pectin is weaker in jellifying power, more pectin is introduced into the mixture, e. g., if 0.5% of the pectin to be used is necessary to produce a good jelly, 5.5 g. pectin is used without altering the amounts of other ingredients.

To make jelly with my pectin product in the amounts given above, the product is added to 2 cups water (1 pint), the water is brought to the boil and then 3 cups sugar (600 grams) is added and the whole mixture is then brought to an active boil throughout. The boiling is then discontinued, the jelly is skimmed and then poured to produce approximately 38½ ounces of jelly. The finished jelly will contain approximately 0.40% pectin, 0.25% acid and 59% sugar. A pectin jelly should contain at least 58 to 59% sugar for proper set. Higher percentages of sugar can be obtained by adding more sugar and cutting down in proportion on the water used to produce a jelly without prolonged boiling.

To produce a flavored jelly the desired amount of flavor and color are incorporated into the mixture as described, e. g., to make a mint flavored jelly, the addition of 4 cc. of 5% essence spearmint and just enough natural or certified food color to give the desired green tint is made to the formula given. This flavored product is made into jelly in the manner described for the unflavored product.

The product of my invention is stable. The pectin is insoluble, does not dissolve or jellify in the product and there is no undesirable interaction of ingredients. It may be marketed in 2 ounce units as described above, or larger units may be employed. Further the ratio of pectin to syrup is not fixed but can be varied, as already noted before, to obtain different degrees of fluidity. The product may be pasteurized without affecting the nature of the product.

The formula given is purely of an exemplary nature and the invention is not by any means limited to this one particular combination of ingredients.

I claim as my invention:

1. A jellifying food product comprising pectin in solid form, acid and a sugar solution in which solution the said pectin is insoluble, the said product being in a paste or liquid form and capable of yielding a jelly when dissolved in water and in fruit juice with the addition of the proper amount of sugar.

2. A jellifying food product comprising pectin, acid, a flavoring ingredient and a liquid sugar medium, the said pectin being insoluble in the said medium but readily soluble upon dilution of the product with water and with fruit juice and adapted to yield a flavored jelly upon the addition of a suitable amount of sugar.

3. A jellifying food product comprising pectin, acid, flavoring and a sugar solution, and characterized by the fact that the said pectin is insoluble in said solution but dissolves readily upon dilution of the product with water and with fruit juice and adapted to yield a flavored jelly upon the addition of a suitable amount of sugar.

4. The process of making a preserve comprising first preparing a mixture of dry powdered pectin and acid and sugar solution the pectin in said mixture being in suspension but not in solution, dissolving the said mixture in the proper amount of water or fruit juice, and combining the solution thus obtained with the proper amount of sugar to form a preserve.

5. The process of making jelly comprising first preparing a mixture of finely divided solid pectin, acid and sugar solution with flavoring and coloring ingredients the pectin in said mixture being in suspension but not in solution, then dissolving the said mixture in a suitable amount of water and combining the solution thus obtained with a suitable amount of sugar to form a jelly.

6. A new article of manufacture consisting of a concentrated syrup carrying pectin in suspension, but not in solution therein.

7. A new article of manufacture consisting of a concentrated syrup carrying pectin in suspension, and which, by the addition of water and a further amount of a carbohydrate will cause the pectin to go into solution and form a jellied mass.

HUGO G. LOESCH.